United States Patent
Lipschultz et al.

[15] 3,688,861
[45] Sept. 5, 1972

[54] ANTI-THEFT DEVICES

[72] Inventors: Paul Lipschultz; Jean-Pierre Leroy, both of Berteaux, Croissy-sur-Seine, France

[73] Assignee: Societe D'Exploitation des Brevets Neiman S.A., Neuilly, France

[22] Filed: June 19, 1970

[21] Appl. No.: 47,706

[52] U.S. Cl. ..................180/114, 70/252, 70/265, 340/64
[51] Int. Cl. ..............................................B60r 25/02
[58] Field of Search ........180/114; 70/252, 265, 283; 340/64

[56] References Cited

UNITED STATES PATENTS

| | | | |
|---|---|---|---|
| 3,021,913 | 2/1962 | Ouimet et al. | 180/114 |
| 3,442,102 | 5/1969 | Butts | 70/252 X |
| 2,102,438 | 12/1937 | Sandberg | 70/252 X |

FOREIGN PATENTS OR APPLICATIONS

| | | | |
|---|---|---|---|
| 159,855 | 11/1921 | Great Britain | 180/114 |
| 472,025 | 1/1929 | Germany | 180/114 |
| 931,156 | 2/1948 | France | 70/252 |

*Primary Examiner*—Benjamin Hersh
*Assistant Examiner*—John P. Silverstrim
*Attorney*—Nolte and Nolte

[57] ABSTRACT

In a lock having a bolt adapted to engage a control element of a motor vehicle, the lock including key operated means having a first position in which the bolt is engaged with the control element and a second position in which the bolt is disengaged from the control element, the improvement comprising means for blocking movement of the key operated means between the two positions, the blocking means including an electromagnet adapted to be placed in an electrical circuit carrying the operating current for the motor vehicle and to respond to a closed condition of the circuit to cause the blocking means to block movement of the key operated means between the two positions and to respond to an open condition of the circuit to cause the blocking means to permit movement of the key operated means.

2 Claims, 5 Drawing Figures

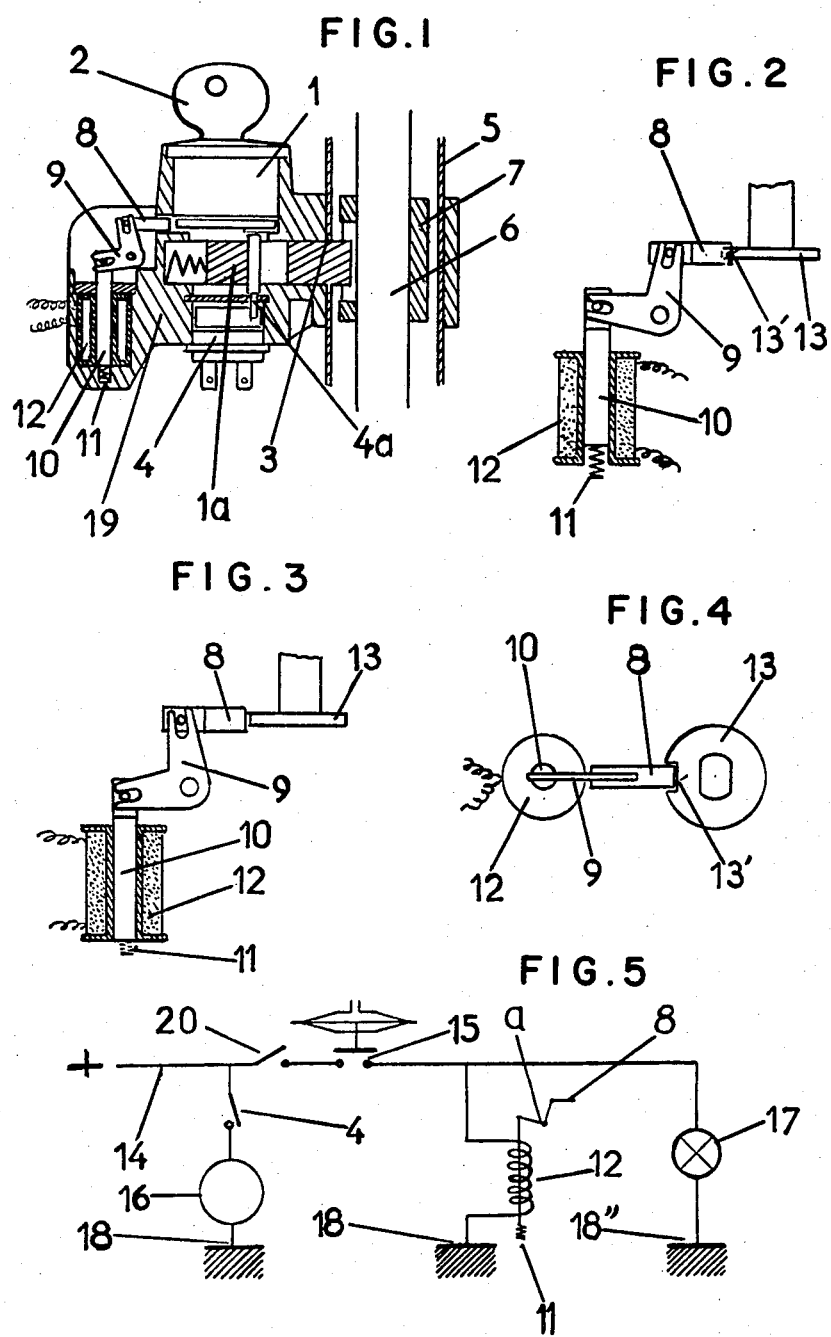

ANTI-THEFT DEVICES

This invention relates to anti-theft devices, particularly for internal combustion engines.

In internal combustion engine vehicles equipped with anti-theft devices it is essential not to be able to put the anti-theft device into the locking position without previously having stopped the engine.

Conversely, it is necessary not to be able to start up the engine before the locking has been eliminated.

With an anti-theft device mounted on an internal combustion engine vehicle, these conditions are satisfied since a switch coupled to the lock of the anti-theft device does not permit feeding of the ignition coil in the locking position.

The same device cannot be applied to a diesel engine vehicle since a diesel engine does not have an ignition coil. This is why certain anti-theft devices for diesel engine vehicles include a connection between the anti-theft device and the drive of the pump of the engine. This connection permits starting up of the engine only after unlocking of the anti-theft device and conversely permits locking only after stopping of the engine.

The device according to the present invention is adapted to improve any anti-theft device for internal combustion engine vehicles other than of the above mentioned type for diesel engines. It comprises an electromagnetic device acting upon a bolt which prevents the rotation of the rotor of the anti-theft device when the engine is running. It may also comprise a switch coupled to the anti-theft device for actuation of the starter and a switch for actuation of the other circuits of the vehicle (hereinafter "general switch"), as in many conventional constructions.

The invention will now be further described by reference to a specific embodiment thereof as illustrated in the drawings, in which:

FIG. 1 is a partial cross section, taken on a plane passing through the axis of lock 1 and the axis of steering column 6, of an anti-theft device equipped with the device according to the invention, in the position effecting locking of the steering with the general supply circuit closed but the engine stopped;

FIG. 2 is on a larger scale a detail of the device according to FIG. 1 but in the "running" position, i.e., with the engine rotating.

FIG. 3 is the same detail as FIG. 2 but in the FIG. 1 position;

FIG. 4 is a plan view of the detail of FIG. 2; and

FIG. 5 is a schematic diagram of the electrical circuitry suitable for the invention.

In FIG. 1 there is seen lock 1 of an anti-theft device, dog 1a of which, upon rotation of key 2, moves bolt 3 and the operating member 4a of the switch 4. The bolt 3 engages in the usual manner in the aperture or striking plate formed in ring 7 which is fixed on steering column 6, casing 19 of the anti-theft device being fixed on tube 5 enclosing the steering column 6.

The casing 19 of the anti-theft device, at an appropriate position relative to the lock, receives electromagnet 12 having a core 10 which is returned upwards by a spring 11 (in the absence of energization) and connected to the lower arm of a bell-crank lever 9, the other end of which lever 9 controls a bolt 8.

The spring 11 has the effect of constantly pushing the free end of the bolt 8 against the periphery of a base 13 (FIG. 4) fixed to the rotor of the lock of the anti-theft device. A notch 13' is formed in the base 13 and is dimensioned to receive the end of the bolt 8 when the notch 13' is facing the bolt 8.

The electromagnet 12 is mounted electrically in parallel with the indicator bulb 17, the latter being mounted on the instrument panel of the vehicle, and both are placed in circuit upon closure of the oil pressure-activated switch 15 (this closure being effected by the absence of pressure, i.e., the engine being stopped).

In FIG. 5 there are seen also the conductor 14 connected to the positive pole of the battery (not shown) and the starter 16 which is placed in circuit by the closing of the switch 4 incorporated in the anti-theft device. The reference 20 indicates the general switch of the vehicle which can be on the instrument panel or incorporated with the switch 4 in the anti-theft device, the reference numerals 18, 18', 18'' indicate common ground returns, connected to the negative pole of the battery.

The operation of the device is effected as follows:

a. Case in which the general switch is not coupled to the anti-theft device:

Let us suppose that the anti-theft device is locked in the position indicated in FIG. 1. The key is engaged but still in the "stop" position and has not caused unlocking. The engine is stopped; on the other hand previous closure of the general switch on the instrument panel has caused the pulling in of the core 10 by the attraction of the electromagnet 12 (FIGS. 1 and 3) The bolt 8 is retracted and, accordingly, the key 2 can be rotated, causing the lock first to unlock the anti-theft device and then, at the end of the rotation, to actuate the starter by closing the switch 4.

As soon as the engine is rotating, the resultant oil pressure interrupts the circuit be means of the oil pressure-actuated switch 15 (FIG. 5). The electromagnet 12 no longer being supplied, the bolt 8 is pushed back by the spring 11 towards the base 13, the bolt 8 contacting the periphery of the base 13.

The mechanism of the anti-theft device, as on a conventional model, automatically returns the lock to an intermediate position ("running" position) when the driver releases the key after having had started up and in that position the plate 13 is oriented with its notch 13' opposite the dog 8 which under the thrust of the spring 11 locks the lock (FIG. 4); by conventional structure of such locks, the key cannot be withdrawn in the "running" position.

This "running" position can be left only after or with the stopping of the engine (stopping of the engine being effected by cutting off the electric supply operating the injection pump by means of the general switch on the instrument panel or otherwise interrupting the combustion to effect decompression thereby the cause opening of the switch 15). To withdraw the key it is necessary to stop the engine, upon which there is closure of the switch 15 and, hence, energization of the electromagnet which unlocks the lock, the dog 8 retracting from the notch 13', permitting rotation of the lock 1 to the "stop" position by means of the key 2 at which position withdrawal of the key 2 effects projection of the bolt 3 into the striking plate formed in the ring 7.

b. Case in which the general switch is coupled to the anti-theft device:

With the anti-theft device locked in the key-withdrawal position, the dog 8 pushed by the spring 11 is in abutment against the periphery of the plate 13. It is possible to turn the key 2, the dog 8 not yet being opposite to the notch 13'.

Slightly before the "running" position, the switch 20, which is coupled to the anti-theft device, is closed. The engine being in a stopped condition, the switch 15 also is closed and the dog 8 is retracted by the electromagnet 12 which permits continuing the rotation to close the switch 4 thereby to actuate the starter and start up the engine. After this phase, the operation is identical with that in the preceding version.

While the invention has been described with reference to certain preferred embodiments thereof, it is intended that the scope of the invention as defined by the appended claims not be construed as being limited to those embodiments.

What is claimed is:

1. In a lock having a bolt adapted to engage a control element of a motor vehicle, the lock including key operated means having a first position in which the bolt is engaged with the control element and a second position in which the bolt is disengaged from the control element, the improvement comprising means for blocking movement of the key operated means between the two positions, said blocking means including an electromagnet adapted to be placed in an electrical circuit carrying the operating current for the motor vehicle and to respond to an open condition of the circuit to cause the blocking means to block movement of the key operated means between the two positions and to respond to a closed condition of the circuit to cause the blocking means to permit movement of the key operated means, means to hold said electrical circuit open when the engine is in a running condition and to enable said electrical circuit to be closed when the engine is not in a running condition said key operated means comprising a rotor and the blocking means comprising a notched plate fastened to the rotor and a second bolt positioned adjacent the plate and operatively associated with the electromagnet for insertion into the notch when the circuit is in an open condition and withdrawal from the notch when the circuit is in a closed condition. in an open condition and withdrawal from the notch when the circuit is in a closed condition.

2. A lock according to claim 1, in which said means to hold said electrical circuit open and to enable said electrical circuit to be closed includes first and second switches, the first switch being manually operable and the second switch being adapted to respond to the oil pressure of the engine to be opened when the engine is running and to be closed when the engine is stationary.

* * * * *